United States Patent
González Senosiain et al.

(10) Patent No.: US 8,346,400 B2
(45) Date of Patent: Jan. 1, 2013

(54) SYSTEM AND METHOD FOR POWER MANAGEMENT IN A PHOTOVOLTAIC INSTALLATION

(75) Inventors: Roberto González Senosiain, Sarriguren (ES); Javier Coloma Calahorra, Sarriguren (ES); Jesús Mayor Lusarreta, Sarriguren (ES); Ainhoa Cárcar Mayor, Sarriguren (ES); Jorge Acedo Sánchez, Sarriguren (ES); David Solé López, Sarriguren (ES); Mikel Zabaleta Maeztu, Sarriguren (ES); Susana Simón Segura, Sarriguren (ES); Javier Pérez Barbáchano, Sarriguren (ES); Luis Marroyo Palomo, Sarriguren (ES)

(73) Assignee: Ingeteam Power Technology, S.A., Bizkaia (ES)

( * ) Notice: Subject to any disclaimer, the term of this patent is extended or adjusted under 35 U.S.C. 154(b) by 3 days.

(21) Appl. No.: 13/023,629

(22) Filed: Feb. 9, 2011

(65) Prior Publication Data
US 2011/0196543 A1 Aug. 11, 2011

Related U.S. Application Data

(63) Continuation of application No. PCT/ES2008/000560, filed on Aug. 12, 2008.

(51) Int. Cl.
 *G05D 3/12* (2006.01)
 *F03D 9/00* (2006.01)
(52) U.S. Cl. .......................................... 700/287; 290/44
(58) Field of Classification Search .................... 290/44; 700/287
See application file for complete search history.

(56) References Cited

U.S. PATENT DOCUMENTS

| | | | |
|---|---|---|---|
| 5,642,007 A | 6/1997 | Gyugyi et al. | |
| 6,542,791 B1* | 4/2003 | Perez | 700/295 |
| 6,724,097 B1 | 4/2004 | Wobben | |
| 6,784,564 B1 | 8/2004 | Wobben | |
| 6,891,281 B2 | 5/2005 | Wobben | |
| 6,906,431 B2 | 6/2005 | Wobben | |
| 7,372,173 B2 | 5/2008 | Lutze et al. | |
| 7,514,907 B2 | 4/2009 | Rajda et al. | |
| 2003/0102675 A1 | 6/2003 | Noethlichs | |
| 2003/0155773 A1 | 8/2003 | Wobben | |
| 2003/0171039 A1* | 9/2003 | Pierson, Jr. | 439/709 |
| 2003/0182023 A1* | 9/2003 | Perez | 700/295 |
| 2004/0027095 A1 | 2/2004 | Wobben | |
| 2004/0264225 A1* | 12/2004 | Bhavaraju et al. | 363/120 |

(Continued)

FOREIGN PATENT DOCUMENTS

EP  1 850 002  10/2007

(Continued)

OTHER PUBLICATIONS

International Search Report issued May 11, 2009 in International (PCT) Application No. PCT/ES2008/000560, 3 pages.

(Continued)

*Primary Examiner* — Charles Kasenge
*Assistant Examiner* — Thomas Stevens
(74) *Attorney, Agent, or Firm* — Sughrue Mion, PLLC

(57) ABSTRACT

A power-management system and method for photovoltaic installations connecting to the grid incorporates monitoring active and/or reactive power, account being taken at all times of grid requirements, in order to allow temporary demand arising in the grid to be addressed, thereby contributing to regulation of the grid and to the stability and quality thereof.

19 Claims, 4 Drawing Sheets

U.S. PATENT DOCUMENTS

| | | |
|---|---|---|
| 2005/0121214 A1 | 6/2005 | Gould |
| 2005/0206167 A1* | 9/2005 | Gehret, Jr. .................. 290/2 |
| 2006/0267560 A1 | 11/2006 | Rajda et al. |
| 2006/0273595 A1 | 12/2006 | Avagliano et al. |
| 2007/0018457 A1 | 1/2007 | Llorente Gonzalez |
| 2007/0047163 A1 | 3/2007 | Lutze et al. |
| 2007/0063519 A1 | 3/2007 | Wobben |
| 2007/0078567 A1 | 4/2007 | Riesberg et al. |
| 2007/0085343 A1 | 4/2007 | Fortmann |
| 2007/0138792 A1* | 6/2007 | Liu et al. .................. 290/1 A |
| 2008/0048501 A1 | 2/2008 | Jurkat et al. |
| 2008/0122449 A1 | 5/2008 | Besser et al. |
| 2009/0055030 A1 | 2/2009 | Mayor et al. |
| 2009/0121549 A1* | 5/2009 | Leonard .................. 307/51 |
| 2009/0160258 A1* | 6/2009 | Allen et al. .................. 307/82 |
| 2011/0118892 A1* | 5/2011 | Mayor et al. .................. 700/295 |

FOREIGN PATENT DOCUMENTS

| | | |
|---|---|---|
| JP | 2001-256781 | 9/2001 |
| JP | 2003/257207 | 9/2003 |
| JP | 2011165684 A * | 8/2011 |
| WO | 03/084041 | 10/2003 |
| WO | 2005/031160 | 4/2005 |
| WO | 2005/067119 | 7/2005 |
| WO | 2005/085634 | 9/2005 |
| WO | 2006/120033 | 11/2006 |
| WO | 2007/006565 | 1/2007 |

OTHER PUBLICATIONS

F. Delfino et al., "An Integrated Active and Reactive Power Control Scheme for Grid-Connected Photovoltaic Production Systems," Power Electronics Specialists Conference, Jun. 15-19, 2008, pp. 1463-1468.

P. G. Barbosa et al., "Control strategy for grid-connected DC-AC converters with load power factor correction," IEE Proc.—Gener. Tansm. Distrib., vol. 145, No. 5, Sep. 1998, pp. 487-491.

Z. Lubosny et al., "Supervisory Control of a Wind Farm," IEEE Transactions on Power Systems, vol. 22, No. 33, Aug. 2007, 10 pages.

A. Hansen et al., "Centralised power control of wind farm with doubly fed induction generators", Renewable Energy 31 (2006) 935-951, ISSN 0960-1481, Aug. 2005.

V. Courtecuisse et al., "Performance comparison of different wind generator based hybrid systems", 2008 $13^{th}$ International Power Electronics and Motion Control Conference (EPE-PEMC 2008) 2184-2191, ISBN: 978-1-4244-1741-4, 2008.

\* cited by examiner

SYSTEM AND METHOD FOR POWER MANAGEMENT IN A PHOTOVOLTAIC INSTALLATION

This application is a continuation of International Application PCT/ES/2008/000560, filed Aug. 12, 2008, which is hereby incorporated by reference in its entirety.

BACKGROUND OF THE INVENTION

I. Field of the Invention

The present invention is applicable to the field of power generation systems based on renewable energy and, more specifically, photovoltaic solar energy.

II. Background of the Invention

At present, grid-connected photovoltaic installations are widely acknowledged in our society. They are installations formed by a plurality of photovoltaic generators (photovoltaic field) and at least one electronic converter that transforms the energy produced by the photovoltaic field (direct current) for injection in the power grid (alternating current).

In this regard, U.S. Patent Publication No. 2008122449 A1 discloses a control scheme for a PhotoVoltaic unit to suitably drive the injection of active and reactive power into a radial distribution grid. An active and reactive power control from preestablished setpoints is disclosed but it is not disclosed how the preestablished setpoints are established or determined.

There is another documents, related with the prior art, as for example IEEE pp. 1463-1468, 15-19 Jun. 2008 of DELFINO, F et al. titled "An integrated active and reactive power control scheme for grid-connected photovoltaic production systems" where is disclosed a system that tries to overcome those problems derived from the sunlight fluctuations, but without taking into account how to manage reactive and active power.

Photovoltaic generator is understood to be any device capable of transforming solar energy into electricity.

All photovoltaic generators have a characteristic voltage-intensity (V-I) curve. This curve varies according to irradiance and the temperature of the photovoltaic generator. There is a voltage-power (V-P) curve associated to this V-I curve that relates the energy produced by the photovoltaic generator to its operating voltage. In order to maximize the energy produced by the photovoltaic field, the photovoltaic converters are equipped with at least one maximum power point (MPP) tracker. The MPP tracker (generally DC/DC conversion structures with input voltage control) determines the operating voltage that will maximize the energy produced by association of the generators connected thereto.

On the other hand, the irradiance incident upon the generator is a function of the angle formed by the plane of the panel that is perpendicular to the sun. Solar trackers are often used to increase the energy produced by photovoltaic installations, whereon the photovoltaic generators are disposed. Solar trackers are mobile structures that pivot around one or two axles (azimuthal and zenithal) controlled by a group of actuators that orient the photovoltaic generators towards the sun, maximizing the irradiance incident thereupon.

Grid-connected photovoltaic systems inject the energy produced by the installation into the power grid. In order to guarantee power grid stability and maintain the frequency and voltage within the established limits, there must be a balance between the power generated and the power consumed. In the case of imbalances between generated and consumed power, the different generation sources must readjust the power generated, thereby re-establishing the balance. To this end, conventional sources are obliged to supply extra power or limit active power (P) and supply or consume reactive power (Q) when required by the power grid. Specifically, the following relationship is fulfilled:

$$S=P+iQ$$

S=apparent or complex power
P=active power
Q=reactive power

In photovoltaic systems, the energy generated is closely related to weather conditions, resulting in a lack of control thereupon. The difficulty of estimating the power that can be supplied by the photovoltaic system at a given time, in view of irradiance uncertainty, prevents the photovoltaic systems of the state of the art from having a power reserve that can be supplied in the event of increased demand.

On the other hand, in the photovoltaic systems of the state of the art, current is injected into the grid at a preset power factor (generally $\cos \phi = 1$), due to which it does not participate in reactive power regulation.

As the number of grid-connected photovoltaic installations grows, so do their negative effects on power grid stability. Therefore, there is a need for developing a management system that will allow control over active and reactive power, providing the system with a power reserve (active and reactive) that will enable it to address temporary power grid requirements.

SUMMARY OF THE INVENTION

The object of the invention is to provide a power management system for grid-connected photovoltaic installations, incorporating an active and reactive power control that takes grid requirements into account at a given time. The management system provides the photovoltaic facility with an active and reactive power reserve which allows it to address temporary grid requirements. By means of said management, the photovoltaic facility can behave as a conventional energy source (thermal, nuclear . . . ), thereby participating in power grid regulation and contributing to the stability and quality thereof.

In order to achieve the objectives and avoid the aforementioned drawbacks, the present invention consists of a method and system for power management in grid-connected photovoltaic installations, which incorporates a control for active and reactive power, taking into account grid requirements at a given time. The invention provides an active and reactive power reserve that allows it to address temporary grid requirements.

In accordance with the present invention, a power management system for a photovoltaic installation formed by:
- at least one control unit (CU) for managing the active and/or reactive power of the photovoltaic installation,
- at least one photovoltaic generator,
- at least one electronic converter (EC) for transforming direct current into alternating current.

In the case of active power management, the system has at least one array formed by the foregoing photovoltaic generators, the energy production of which is individually controlled. Said array is called power control minimum unit (PCMU).

In order to control the active power of the photovoltaic installation, the present invention comprises the following stages:
Establish an active power reserve setpoint for the installation.

Determine a first array of PCMUs that will operate without limiting its active power.

Estimate the power producible by the photovoltaic installation.

Determine a second array of PCMUs that will operate limiting its active power at a certain value.

Limitation of the active power of the elements of the second PMCU array may be established through the active power reserve setpoint and estimation of producible power.

In turn, the aforementioned estimation of producible power may be obtained through one or several of the following methods:

Through the power generated by the first PMCU array.

Through at least one balanced photovoltaic cell.

Taking into account the orientation of any of the PMCU arrays with respect to the sun.

Based on a sample of the V-I curve of the PMCU, which is obtained from the periodic variation in operating voltage of the PMCU.

In a preferred embodiment of the invention, the active power reserve setpoint is determined using an economic optimization algorithm and/or grid frequency control loop and/or any other external requirement and/or using an installation power output variation rate control loop.

In a preferred embodiment, the number of units that form the second PMCU array is selected based on the limitation of active power required from said array, taking into account that the number of units that form the first PMCU array must constitute a representative sample under the operating conditions of the photovoltaic installation.

In another preferred embodiment, a percentage of the active power reserve is obtained by:

Modifying the orientation of at least one of the units of the second PMCU array.

Controlling the operating voltage of at least one of the units of the second PMCU array.

Connecting and disconnecting at least one PMCU.

Another preferred embodiment includes, in the photovoltaic installation, at least one controlled load that allows consumption of the active power reserve of the installation, being a percentage of the active power reserve of the installation.

The controlled load may be an electric load or an energy storage unit, such as an electrolyzer, a battery, a flywheel or supercapacitor. Depending on its nature, it can be connected to the power grid or at the entrance of at least one EC. The controlled load is subordinated to grid active power demand. If the grid were to require extra power, consumption of the controlled load would decrease or even be switched off. This will ensure that the power reserve is adequately used.

The energy stored in each energy storage unit can be used to control the variations in the power output of the installation. For example, in the event of a variation in irradiance that produces as a consequence a proportional variation in the power output, the storage units will be used to supply energy, controlling said variation in power in accordance with preset criteria.

The method also makes reference to reactive power control on establishing a reactive power setpoint for the photovoltaic installation and, subsequently, determining the reactive power generated or consumed by each electronic converter of the installation.

The reactive power setpoint can be determined using an economic optimization algorithm, a grid voltage control loop or external requirements.

In a preferred embodiment of the invention, the reactive power generated or consumed by each electronic converter of the photovoltaic installation, is determined based on its reactive power generation or consumption capacity.

In another preferred embodiment, the reactive power setpoint is modified in at least one of the electronic converters using an internal voltage regulation loop to maintain its output voltage within the established limits.

Reactive power can be controlled independently in each of the electronic converters.

The system can also comprise:

at least one local control unit (LCU) associated to each PMCU;

at least one communications network that interconnects at least one LCU with at least the CU and at least one EC.

In a preferred embodiment, the system includes, in the CU, active power management means for monitoring the active power of the different PMCUs, establishing the operating mode of each PMCU and sending active power setpoints to each PMCU.

In other preferred embodiments, the photovoltaic installation includes a device capable of controlling the position of at least one PMCU (for example, a tracker) with respect to the sun. Alternatively, a device capable of controlling the operating voltage of at least one PMCU may be included.

In a preferred embodiment, the CU and LCU form part of a single device.

By way of example, the CU, LCU and EC may be housed in the same casing or in different casings (discrete elements).

Below, in order to help to better understand this specification and forming an integral part thereof, it is accompanied by figures wherein the object of the invention has been represented in an illustrative and non-limiting manner, in addition to some figures belonging to the state of the art which have been previously described.

In preferred embodiment, the system for power management in a photovoltaic installation which comprises at least one control unit (CU), at least one photovoltaic generator, at least one electronic converter (EC) for transforming direct current into alternating current. The CU comprises means for managing power in the photovoltaic installation, selected from among active power management means, reactive power management means and a combination thereof. The system for power management in a photovoltaic installation further comprises at least one array of photovoltaic generators, the energy production of which is individually controlled (power control minimum unit -PMCU-), one local control unit (LCU) associated to each photovoltaic generator, a communications network that interconnects at least one local control unit (LCU) with at least the control unit (CU) and with at least one electronic converter (EC). The system further includes at least one controlled load that consumes the active energy generated by the photovoltaic installation, being a percentage of the active power reserve of the installation. Said controlled load is connected in parallel to the entrance of the electronic converters (EC) or in parallel to the exit of the electronic converters (EC).

DESCRIPTION OF THE INVENTION

Examples of the invention are described below, quoting references from the figures.

Figure 1:
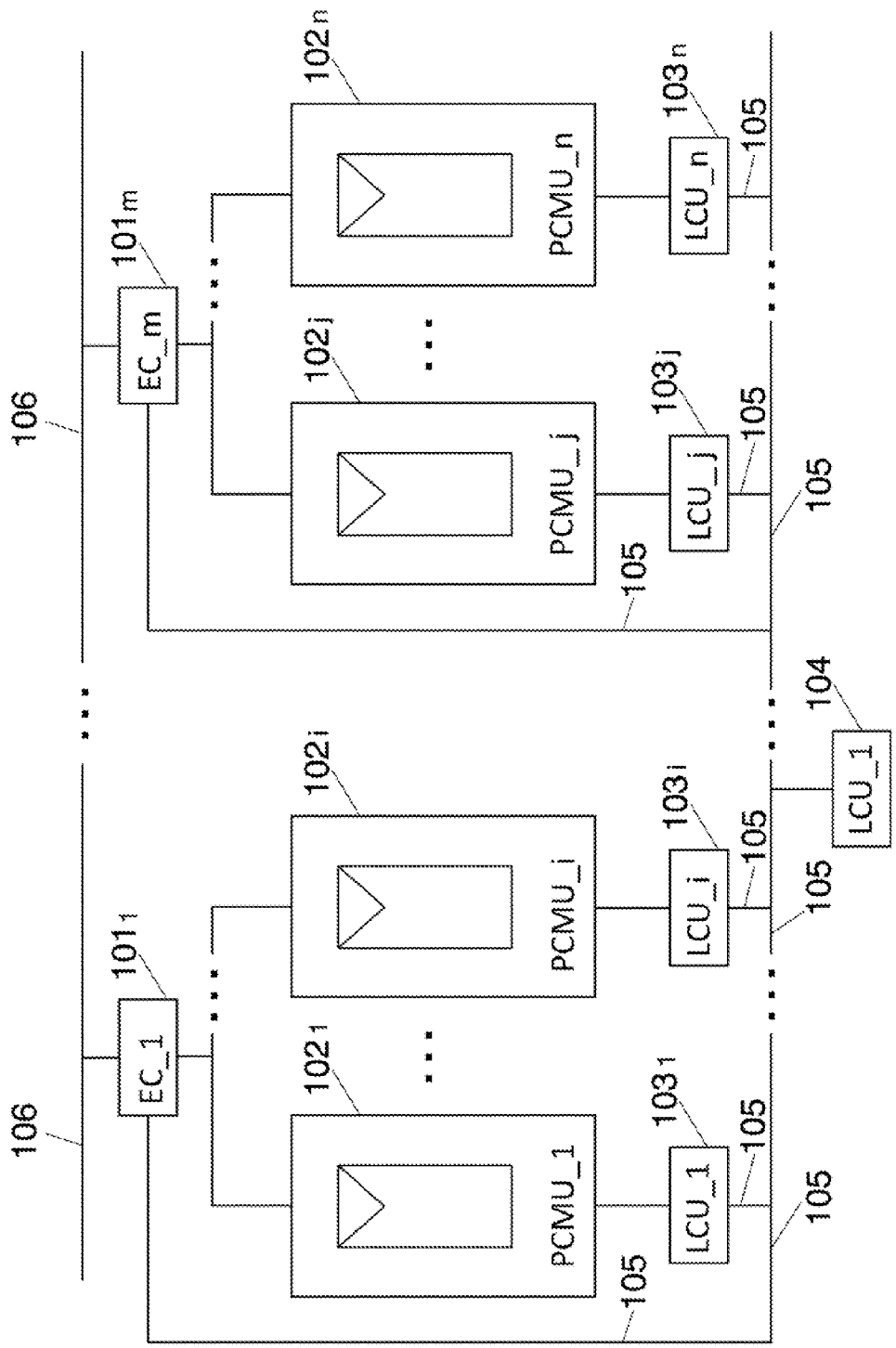
FIG. 1 shows a preferred embodiment of the elements that integrate a photovoltaic installation, according to the invention.

FIG. 1 shows a schematic view of a photovoltaic system wherein the proposed power management system is implemented. The photovoltaic system is formed by:
- a control unit (CU) (104);
- a plurality of power control minimum units (PCMU_1-PCMU_n) ($102_1 \ldots 102_n$), each of which is connected to a local control unit (LCU_1-LCU_n) ($103_1 \ldots 103_n$);
- a plurality of electronic converters (EC_1-EC_m) ($101_1 \ldots 101_m$) whereto at least one UMCP is connected. Said CE transform the energy produced by the different UMCP connected thereto for injection into the power grid (106);
- a communications network (105) that interconnects the different local control units (LCU_1-LCU_n) ($103_1 \ldots 103_n$) with the control unit (CU) (104) and the electronic converters ($EC_1\text{-}EC_m$) ($101_1 \ldots 101_m$);

Each previously described PCMU (PCMU_1-PCMU_n) ($102_1 \ldots 102_n$) will depend on the characteristics of the installation and which may be:
- An array of photovoltaic generators disposed on at least one solar tracker. In installations with solar trackers, the position of the tracker can be controlled, which provides the possibility of controlling the energy produced by said generators.
- An array of photovoltaic generators connected to at least one conversion structure (DC/DC or DC/AC) with input voltage control. Each conversion structure provides independent control over the operating voltage of the associated generators, providing the possibility of controlling the energy produced by said generators.
- An array of photovoltaic generators with sectioning elements that allow connection and disconnection thereof from the electronic converters ($EC_1\text{-}EC_m$) ($101_1\text{-}101_m$).
- Any combination of the foregoing.

Each PCMU can operate under two operating modes governed by the CU through its corresponding LCU whereto it is connected: observer mode (OM) and reserve mode (RM). When a PCMU operates under MO mode it supplies the maximum active power available at a given time (depending on the weather conditions), without any restriction thereupon. When a PCMU operates under RM mode, the CU limits the active power supplied by said PCMU.

When part of the installation is made to operate under MR mode, the total active power of the installation remains below the maximum power available under instantaneous radiation conditions. The maximum active power available is estimated based on the data supplied by the PCMU under OM mode. Of the total PCMU of the installation (n), there will be (u) PCMUs that will operate under RM mode and (n-u) PCMUs that will operate under OM mode.

Figure 2:
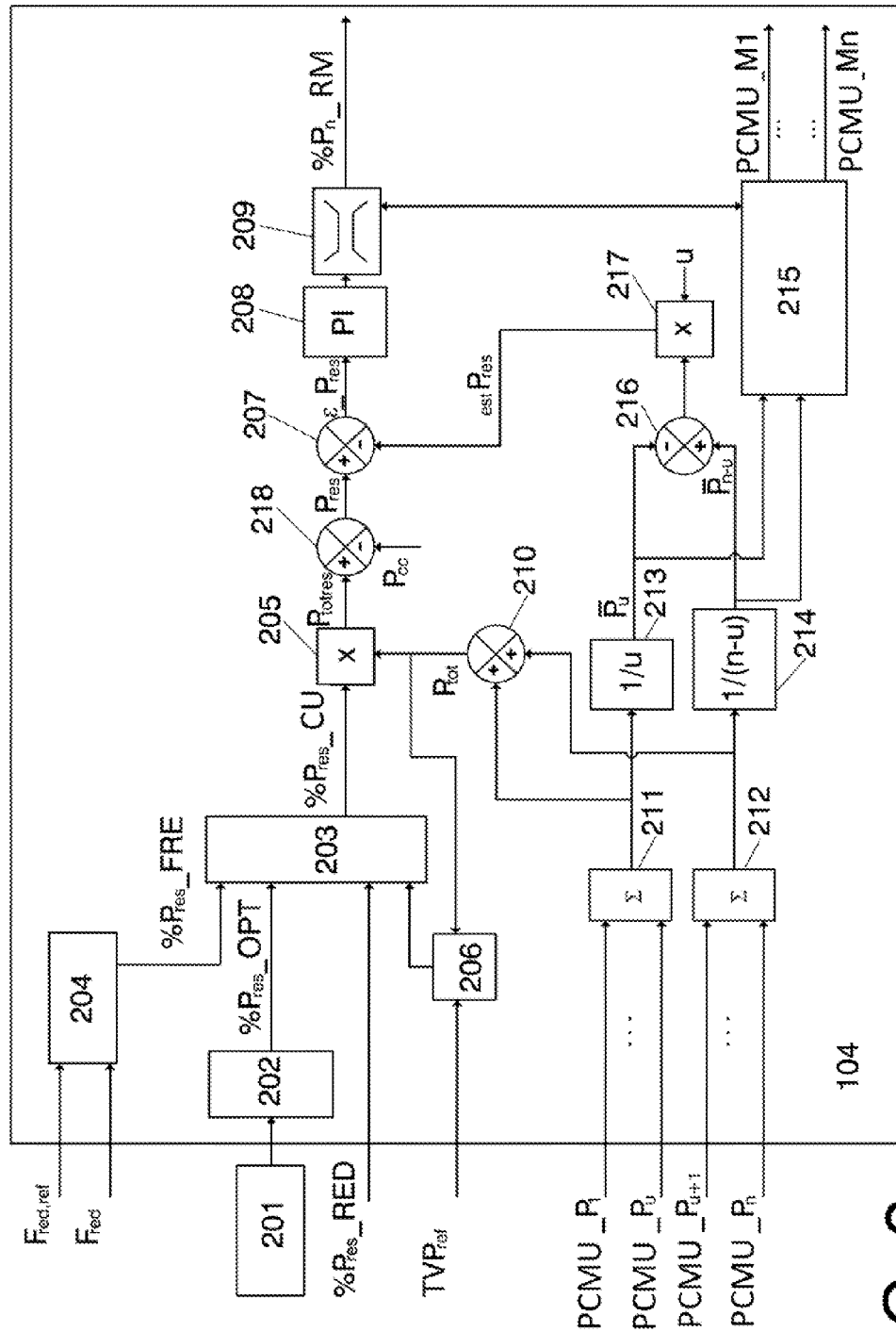
FIG. 2 shows a preferred embodiment for controlling the active power of the installation.

FIG. 2 represents a preferred embodiment for controlling the active power of the photovoltaic installation. The invention envisages obtaining a setpoint that consists of an active power reserve, which can be defined as a percentage of the active power produced in the installation at a given time (% $P_{res}\_CU$). In another embodiment, obtaining the setpoint can be defined as a percentage of the nominal active power of the installation or as a desired active power value for the photovoltaic system in absolute units (for example, kW). The value of said setpoint is selected in a block (203) based on several criteria, which can be:
- a value established by the power grid operator (% $P_{res}\_RED$);
- a value generated in the CU (104) in accordance with several predefined criteria in an optimization algorithm (% $P_{res}\_OPT$) contained in a block (202). This algorithm takes into account parameters (201) such as production optimization, active power reserve, grid stability at a given time, bonuses on account of the active power reserve, tariff information, profit optimization, etc.;
- a value generated in the CU based on grid frequency (% $P_{res}\_FRE$). In this case, grid frequency ($F_{grid}$) is subtracted from a reference frequency ($F_{grid, ref}$) in a block (204) which provides control over grid frequency stability, obtaining a frequency error. This error is applied to a controller included in the block (204) in order to obtain the percentage of active power reserve (% $P_{res}\_FRE$);
- a setpoint generated in the CU (104) based on the active power output variation rate of the installation. This provides control over active power output in the event of variations in irradiance, for the purpose of mitigating the effect of said variations in irradiance on active power output. The generation of this setpoint is obtained from a predefined variation rate ($TVP_{ref}$) and from the total active power ($P_{tot}$, defined below) produced by the system, through a block (206).

The CU (104) also receives the measurement of active power of each PCMU as an entry PCMU (PCMU_1-PCMU_n). These data are used to calculate the total active power ($P_{tot}$) produced by the system, through the blocks (211, 212, 213), according to the following expression:

$$P_{tot} = \Sigma(PCMU\_P_1 \ldots PCMU\_P_u) + \Sigma(PCMU\_P_{U+1} \ldots PCMU\_P_n)$$

The selected active power reserve setpoint as a percentage, % $P_{res}P\_CU$, is converted into absolute units in the block (205), in accordance with the following equation:

$$P_{totres} = \%P_{res}\_CU \cdot P_{tot}$$

In other embodiments, this power value in absolute units could be given as a direct setpoint.

The UC (104) calculates the average value of the active power supplied by the PCMUs under reserve mode -RM- through the block (213) ($\overline{P}_u$) and under observer mode -OM- through the block (214) ($\overline{P}_{n-u}$). These values are used to determine the estimated current active power reserve in the installation, through the blocks (216, 217), according to the equation:

$$_{est}P_{res} = (\overline{P}_{n-u} - \overline{P}_u) \cdot u$$

The figure also includes the existence of a controlled load that consumes part of the active energy generated by the photovoltaic installation ($P_{cc}$). Said controlled load allows the use of the active power reserve. The value of the controlled load ($P_{cc}$) is subtracted from the total active power reserve ($P_{totres}$) in the block (218), obtaining the active power reserve value ($P_{res}$), according to the following expression:

$$P_{res} = P_{totres} - P_{cc}$$

The estimated active power reserve ($_{est}P_{res}$) is subtracted from the setpoint $P_{res}$ in the block (207), giving the error ($\epsilon\_P_{res}$) according to the following expression (207):

$$(\epsilon\_P_{res} = P_{res} - {_{est}P_{res}})$$

This error is introduced into a controller (208) which can be a PI (proportional-integral) or any other kind of controller.

The output of said controller is applied to a limiter block (209) which limits it in accordance to several criteria, such as for example, the characteristics of the PCMUs, the number of PCMUs operating under RM mode and the total active power produced by the installation so that it does not exceed the established limit active power. The limited output is the maximum percentage of nominal active power that must not be exceeded by the PCMUs operating under RM mode (% $P_n\_RM$).

The number of PCMUs operating under RM and OM mode is selected at a given time based on the operating conditions of each of the PCMUs through the block (215). When the value % $P_n\_RM$ descends from a certain threshold, the UC (104) passes at least one PCMU from OM mode to RM mode. The selection of the PCMUs operating under OM mode is carried out so that the sample is representative of the installation (PCMU_$M_1$ ... PCMU_$M_n$).

The operating mode of each PCMU and the value of % $P_n\_RM$ are transmitted to the LCU through the communications network (105). The LCU is in charge of fulfilling the limitation established by the % $P_n\_MR$, governing the operation of each PCMU.

In another preferred embodiment, at least one photovoltaic cell calibrated so as to estimate the active power available in the installation is incorporated in the system, which allows a reduction in the number of PCMUs operating under OM mode.

In another preferred embodiment applicable to installations consisting of photovoltaic generators disposed on solar trackers, the CU (104) determines the position of the different trackers to obtain the active power reserve required based on the equations that govern the irradiance incident upon the generator in accordance with its orientation with respect to the sun.

Figure 4:
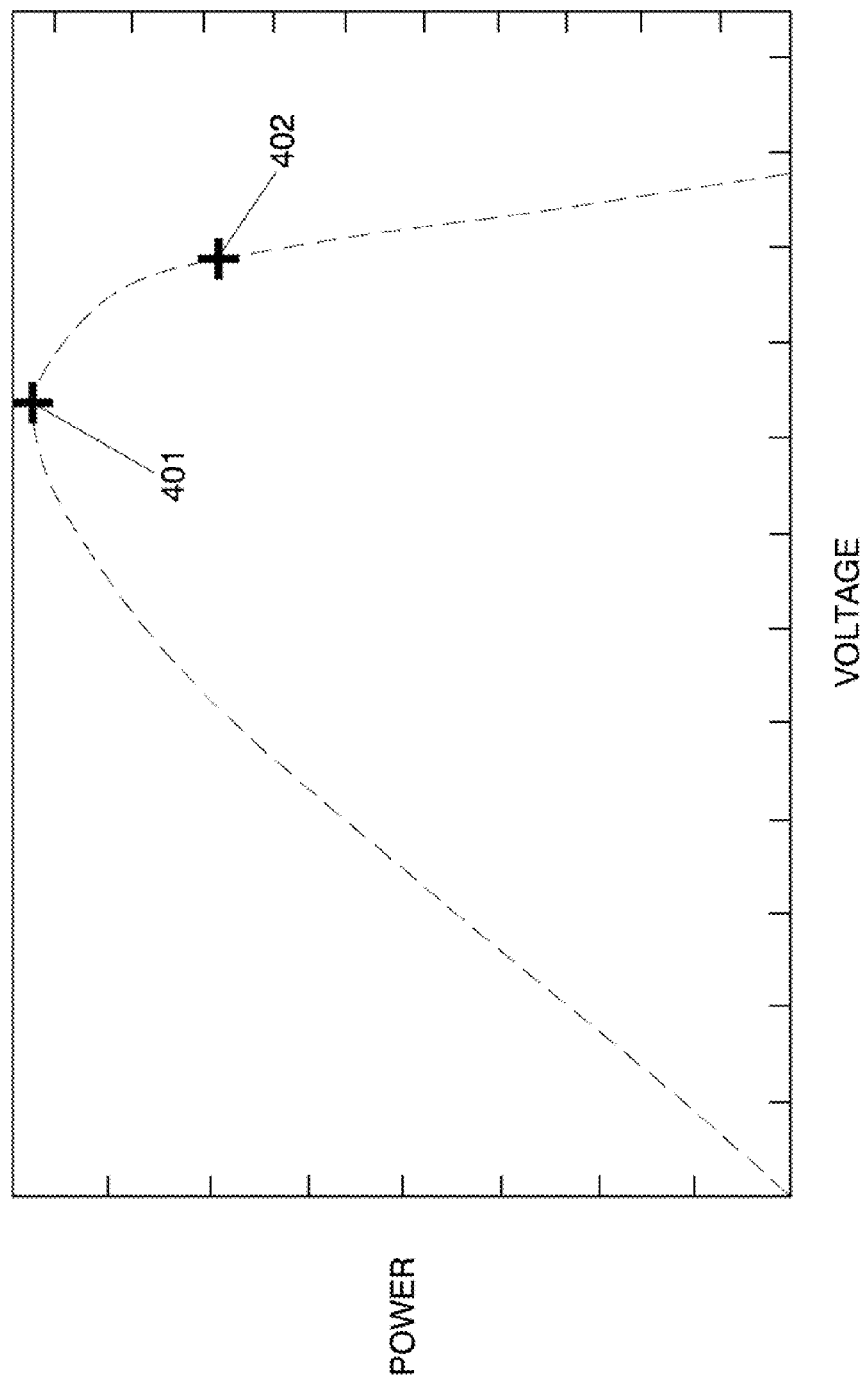
FIG. 4 represents a practical example of the voltage-power curve of a conventional photovoltaic generator.

FIG. 4 shows an example of operation applicable to PCMUs wherein input voltage is controlled. Here, the PCMUs under OM mode operate at the maximum power point (MPP) (401), while the PCMUs under RM mode operate at a voltage (402) so as to enable the power limitation established by the control method (active power reserve).

Figure 3:
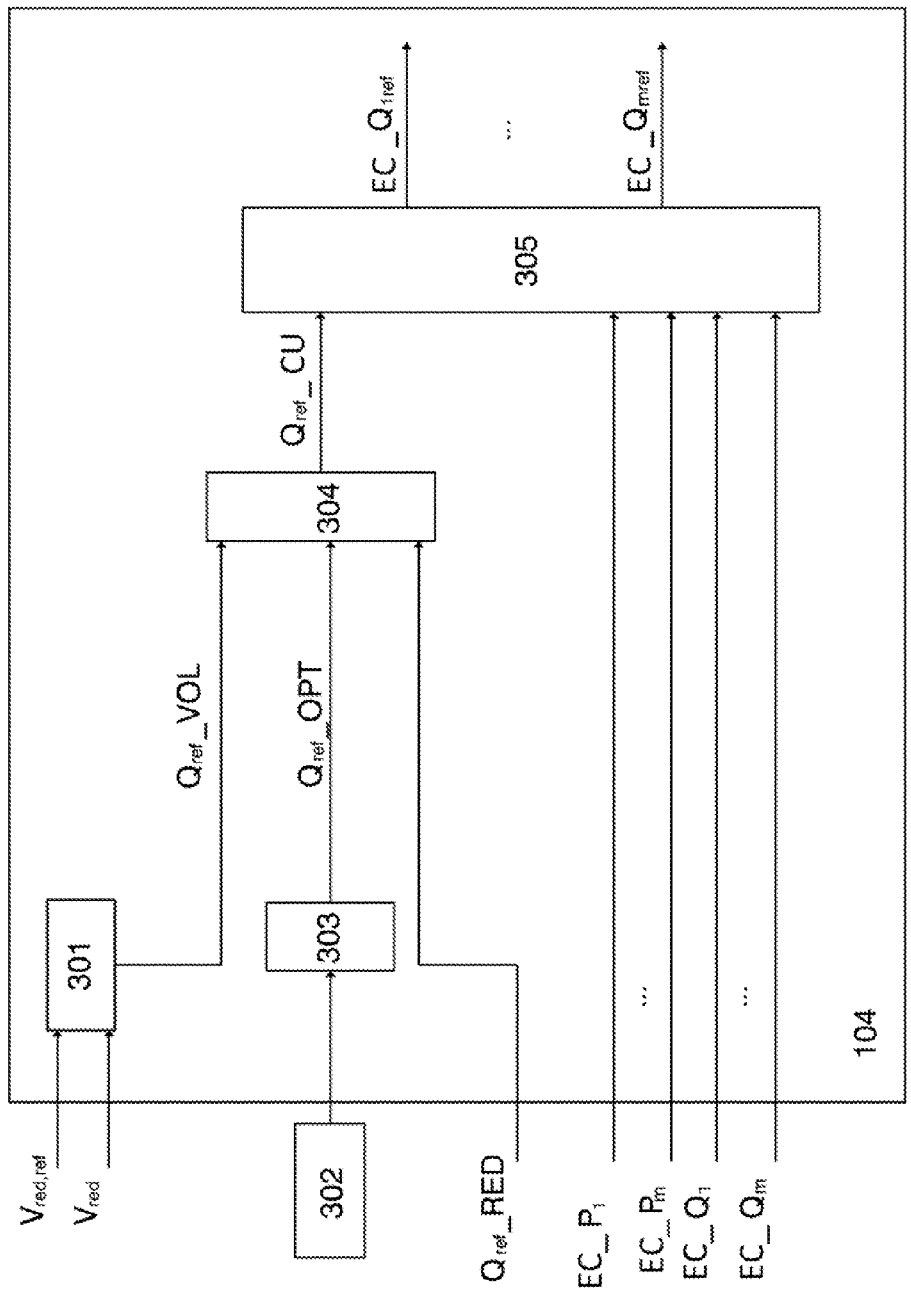
FIG. 3 shows a preferred embodiment for controlling the reactive power of the installation.

FIG. 3 represents a preferred embodiment for controlling the reactive power of the photovoltaic installation. In said invention, the active and reactive power of each of the ECs is monitored and the reactive power setpoint of each is determined.

The reactive power setpoint ($Q_{ref}\_CU$) can be defined as a percentage of the active power of the installation (% $Q_{ref}$) or as an absolute value. Said setpoint is selected in the block (304) in accordance with several criteria, which may be:
  a value established by the power grid operator ($Q_{ref}\_RED$);
  a value generated in the CU (104) ($Q_{ref}\_OPT$) in accordance with several criteria predefined in a block (303), based on an optimization algorithm. This algorithm could take into account parameters represented by a block (302), such as production optimization, grid stability at a given time, bonuses on account of the active power reserve, tariff information, profit optimizations, etc.;
  a value generated in the CU (104) based on grid voltage ($V_{red}$). In this case, grid voltage ($V_{red}$) is subtracted from the reference voltage ($V_{red,\ ref}$) in a block (301), obtaining a voltage error. This error is applied to a controller included in the block (301) to obtain the reactive power setpoint ($Q_{ref}\_VOL$).

Subsequently, the CU (104) determines the reactive power that must be supplied by each of the EC (EC_$Q_{1ref}$ ... EC_$Q_{mref}$). This distribution is carried out in a coordinated manner between the different ECs through a block (305) that executes an optimization algorithm which takes into account:
  The active power of each EC (EC_$P_1$ ... EC_$P_m$).
  The reactive power of each EC (EC$Q_1$ ... EC$Q_m$).
  The effort required from each (proportion of reactive power produced with respect to its capacity), for the purpose of reducing the electrical stress of the ECs.

The optimization algorithm also takes into account parameters such as capacity to respond to the different ECs, etc.

The values of EC_$Q_{1ref}$ ... EC_$Q_{mref}$ are transmitted to the different ECs through the communications network (105).

In a preferred embodiment, the EC may include a fast voltage regulation loop to modify the setpoint received from the CU in order to maintain the voltage at the exit of the EC within the established limits.

In other embodiments, reactive power can be controlled independently in each of the ECs, following the established criteria.

The invention claimed is:

1. A method for power management in a photovoltaic installation equipped with a plurality of power control minimum units (PCMU), said method including carrying out an active power control comprising:
  establishing an active power reserve set_point for the photovoltaic installation; the active power reserve set_point being selected from among an economic optimization algorithm, a grid frequency control loop, external requirements, an installation power output variation rate control loop and a combination thereof;
  determining a first array of power control minimum units "PCMU" which operate without limiting active power of the photovoltaic installation;
  estimating the active power producible by the photovoltaic installation; and
  determining a second array of power control minimum units "PCMU" which operate so as to limit the active power of the photovoltaic installation at a certain value; where the limiting operation is established from the active power reserve set_point and from the estimation of producible active power.

2. The method of claim 1, wherein the estimation of producible active power is obtained by at least one option selected from the group consisting of: power generated by the first array of power control minimum units "PCMU", at least one calibrated photovoltaic cell, an orientation of any of the arrays of power control minimum units "PCMU" with respect to the sun and from a sample of the V-I curve of the power control minimum units "PCMU", obtained by variation in a periodic operating voltage of the power control minimum units "PCMU".

3. The method of claim 1, wherein the number of units that form the second array of power control minimum units "PCMU" is selected based on an active power limitation required from said second array of power control minimum units, and taking into account that the number of units that form the first array of power control minimum units "PCMU" must constitute a representative sample of the photovoltaic installation.

4. The method of claim 1, wherein a percentage of the active power reserve is obtained by modifying an orientation of at least one of the power control minimum units of the second array of power control minimum units "PCMU".

5. The method of claim 1, wherein a percentage of the active power reserve is achieved by controlling the operating voltage of at least one of the power control minimum units of the second array of power control minimum units "PCMU".

6. The method of claim 1, wherein a percentage of the active power reserve is obtained through the connection and disconnection of at least one power control minimum unit "PCMU".

7. The method of claim 1, wherein a percentage of a desired active power reserve is obtained from the consumption of a controlled load.

8. A method for power management in a photovoltaic installation equipped with at least one electronic converter, said method includes carrying out a reactive power control comprising:
   establishing a reactive power set point for the photovoltaic installation; and
   determining a reactive power generated or consumed by each electronic converter of the installation;
   wherein:
   the reactive power reserve set point is selected from among an economic optimization algorithm, a grid voltage control loop, external requirements and any combination thereof;
   the reactive power generated or consumed by each electronic converter is carried out in a coordinated manner between different electronic converters through a block that executes an optimization algorithm based on the following criteria:
   i) an active power of each electronic converter;
   ii) the reactive power of each electronic converter;
   iii) a proportion of reactive power produced with respect to its capacity.

9. The method of claim 8, wherein it further comprising modifying the reactive power set point in at least one of the electronic converters, by an internal voltage regulation loop to maintain an output voltage within previously established limits.

10. The method of claim 8, wherein the reactive power is controlled independently in each of the electronic converters.

11. A system for power management in a photovoltaic installation, said system comprising:
   at least one control unit "CU", where said CU comprises means for managing power in the photovoltaic installation, selected from among active power management means, reactive power management means and a combination thereof;
   at least one Power Control Minimum Unit "PCMU" consisting of an array of photovoltaic generators where an energy production of each Power Control Minimum Unit is individually controlled;
   at least one electronic converter "EC" for transforming direct current into alternating current;
   one local control unit "LCU" associated to each array of PCMU;
   a communications network that interconnects at least one local control unit "UCL" with at least the control unit "CU" and with at least one electronic converter "EC";
   wherein the means for managing the active power of the control unit comprises the following means:
   means for monitoring the active power of different PCMUs;
   means for establishing an operating mode of each PCMU;
   means for sending active power set points to each PCMU.

12. The system of claim 11, wherein the control unit "CU" and local control unit "LCU" form part of a single device.

13. The system of claim 11, further including a device for controlling a position of at least one PCMU with respect to the sun.

14. The system of claim 11, further including a device for controlling an operating voltage of at least one PCMU.

15. The system of claim 11, further including at least one controlled load that consumes the active energy generated by the photovoltaic installation, being a percentage of the active power reserve of the photovoltaic installation.

16. The system of claim 15, wherein the controlled load is an element selected from among an electric load and an energy storage unit, in turn selected from among an electrolyzer, a battery, a flywheel and a supercapacitor.

17. The system of claim 16, wherein the control unit comprises means for controlling variations in power output of the installation, using energy stored in each energy storage unit.

18. The system of claim 15, wherein said controlled load is connected in parallel to an entrance of the electronic converters "EC".

19. The system of claim 15, wherein said controlled load is connected in parallel to an exit of the electronic converters "EC".

* * * * *